United States Patent
Bunch et al.

(10) Patent No.: US 7,724,177 B2
(45) Date of Patent: May 25, 2010

(54) SYSTEMS AND METHODS FOR LOCATION-BASED DISCRIMINATION OF TURBULENCE

(75) Inventors: Brian P. Bunch, Snohomish, WA (US); Ken Kuttler, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 104 days.

(21) Appl. No.: 12/179,812

(22) Filed: Jul. 25, 2008

(65) Prior Publication Data

US 2010/0019958 A1    Jan. 28, 2010

(51) Int. Cl.
*G01S 13/95*    (2006.01)
(52) U.S. Cl. .................... 342/26 R; 342/26 B; 342/179; 342/182; 340/945
(58) Field of Classification Search ............... 342/26 R, 342/26 B, 179, 182; 340/945, 961, 968
See application file for complete search history.

(56) References Cited

U.S. PATENT DOCUMENTS

| | | | |
|---|---|---|---|
| 5,398,033 A | | 3/1995 | Michie |
| 6,014,606 A | * | 1/2000 | Tu .............................. 701/200 |
| 6,199,008 B1 | * | 3/2001 | Aratow et al. ................ 701/120 |
| 6,381,538 B1 | | 4/2002 | Robinson et al. |
| 6,549,161 B1 | | 4/2003 | Woodell |
| 6,633,801 B1 | * | 10/2003 | Durlacher et al. ............... 701/9 |
| 6,650,972 B1 | | 11/2003 | Robinson et al. |
| 6,720,891 B2 | * | 4/2004 | Chen et al. ................... 340/969 |
| 6,917,860 B1 | | 7/2005 | Robinson et al. |
| 6,934,608 B2 | * | 8/2005 | Qureshi ........................ 701/4 |
| 6,977,608 B1 | | 12/2005 | Anderson et al. |
| 7,027,898 B1 | | 4/2006 | Leger et al. |
| 7,109,913 B1 | | 9/2006 | Paramore et al. |
| 7,492,305 B1 | * | 2/2009 | Woodell et al. ........... 342/26 B |
| 7,609,200 B1 | * | 10/2009 | Woodell et al. ............. 342/176 |
| 7,612,688 B1 | * | 11/2009 | Vigeant-Langlois et al. 340/971 |
| 2005/0010359 A1 | * | 1/2005 | Qureshi ....................... 701/205 |
| 2006/0005147 A1 | * | 1/2006 | Hammack et al. ........... 715/805 |
| 2006/0129286 A1 | * | 6/2006 | King ............................. 701/4 |
| 2007/0159383 A1 | | 7/2007 | Fleming |
| 2007/0162197 A1 | | 7/2007 | Fleming |
| 2008/0022217 A1 | | 1/2008 | Aspen |
| 2009/0177343 A1 | * | 7/2009 | Bunch et al. .................. 701/14 |
| 2009/0219197 A1 | * | 9/2009 | Bunch ....................... 342/26 B |

FOREIGN PATENT DOCUMENTS

EP    1944621 A1    7/2008

* cited by examiner

*Primary Examiner*—John B Sotomayor
(74) *Attorney, Agent, or Firm*—Black Lowe & Graham PLLC

(57) ABSTRACT

Systems and methods differentiate weather, such as storm cells and/or turbulence regions, based on location relative to a planned flight path of an aircraft. An exemplary embodiment compares a location of the weather with a location of a region of space corresponding to the planned flight path of the aircraft. In response to the location of the weather region being outside of the region of space, an icon is presented on a display corresponding to the weather using a first icon format. In response to location of the weather being within the region of space, the icon corresponding to the weather is presented on the display using a second icon format, the second icon format different from the first icon format.

20 Claims, 4 Drawing Sheets

SYSTEMS AND METHODS FOR LOCATION-BASED DISCRIMINATION OF TURBULENCE

BACKGROUND OF THE INVENTION

An aircraft employs a variety of turbulence detection systems to identify and indicate regions of turbulence near the aircraft. For example, information received from a radar system may be used to identify nearby storm cells and/or turbulence regions. The location of the storm cells and/or the turbulence regions may then be indicated to the crew of the aircraft on a display. For example, icons corresponding to the storm cells and/or turbulence regions may be presented on the display. An icon can be of fixed shape and/or size. Additionally, an icon can depict an arbitrarily shaped area with a distinctive pattern, color, and/or boundary that corresponds to the actual size of the weather-related phenomenon.

The graphical display of the icons corresponding to the storm cells and/or the turbulence regions on the display is limited since the display presents a two dimensional plan view of the weather information with respect to the aircraft. That is, displayed graphic icons corresponding to the storm cells and/or the turbulence regions indicate a length and a width of the storm cells and/or the turbulence regions. However, the icons do not graphically display vertical information (i.e., the altitude) for the storm cells and/or the turbulence regions. Prior art solutions include presentation of altitude information using alpha numerical text.

However, it may be difficult and time consuming for the crew of the aircraft to discern and understand the presented alpha numeric altitude information of the storm cells and/or the turbulence regions. Further, once the crew appreciates the altitude information, they must make decisions as to the relevance and/or significance of the altitude information.

For example, if a severe turbulence region lies within the planned flight path, the crew may decide to alter the planned flight path to avoid the severe turbulence. On the other hand, the altitude information of the severe turbulence region may be different than the altitude of the planned flight path. Accordingly, the crew may not wish to alter the planned flight path to avoid the severe turbulence region.

However, the above described process of identifying turbulence regions, appreciating the significance of the location of the severe turbulence region with respect to the planned flight path, and then making a decision to adjust or not adjust the planned flight path, may take a significant amount of time and attention of the aircraft crew. Further, the distraction to the aircraft crew when considering the above-described information regarding identified turbulence regions may divert their attention from other matters. Accordingly, it is desirable to present information pertaining to the relative location and relative significance of turbulence regions in a manner that may be quickly and easily understood by the aircraft crew.

SUMMARY OF THE INVENTION

Systems and methods for differentiating weather, such as storm cells and/or turbulence regions, based on location relative to a planned flight path of an aircraft are disclosed. An exemplary embodiment compares a location of the weather with the location of a region of space corresponding to the planned flight path of the aircraft. In response to the location of the weather being outside of the region of space, an icon is presented on a display corresponding to the turbulence region using a first icon format. In response to location of the weather being within the region of space, the icon corresponding to the turbulence region is presented on the display using a second icon format, the second icon format different from the first icon format.

In accordance with further aspects, an exemplary embodiment comprises a radar system configured to detect weather, a processor system, and a display system with a display screen. The processor system is configured to receive information from the radar system corresponding to the detected weather, determine a location of a region of turbulence from the received information from the radar system, and compare the location of the turbulence region with a location of a region of space corresponding to a planned flight path of an aircraft. In response to the determined location of the turbulence region being outside of the region of space, the processor system generates an icon corresponding to the turbulence region using a first icon format. In response to determined location of the turbulence region being within the region of space, generate the icon corresponding to the turbulence region using a second icon format, the second icon format different from the first icon format. The display system is configured to receive the generated icon from the processor system and configured to present the received icon on a display screen.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
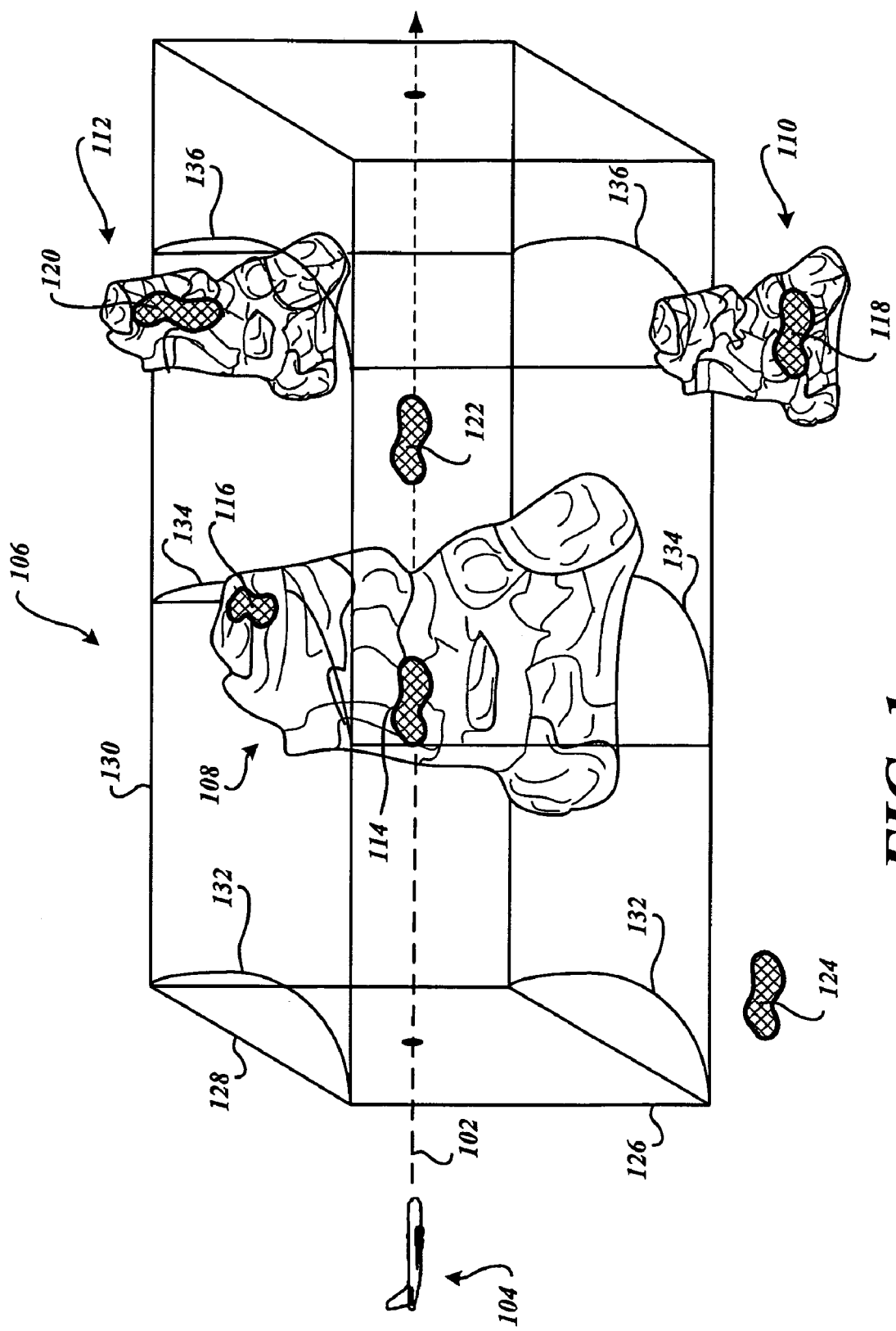
FIG. 1 is a perspective view of a portion of a planned flight path of an aircraft through a region of space having a plurality of storm cells and turbulence regions.

FIG. 1 is a perspective view of a portion of a planned flight path 102 of an aircraft 104 through a region of space 106 having different types of weather. The weather in this example includes a plurality of storm cells 108, 110, 112, and turbulence regions 114, 116, 118, 120, 122, 124. The term "weather" generally refers to any types of detectable weather phenomena, such as, but not limited to, storm cells, turbulence regions, clouds, precipitation, hail, snow, wind shear, icing conditions, and the like that an aircraft 104 may encounter.

The turbulence regions 114 and 116 reside in the storm cell 108. The turbulence region 118 resides in the storm cell 110 and the turbulence region 120 resides in the storm cell 112. The turbulence regions 122 and 124 are known as clear air turbulence and do not reside in and/or are not associated with a particular storm cell. The turbulence regions 114, 116, 118, 120, 122, 124 are conceptually illustrated as cross-hatched regions for delineation from the storm cells 108, 110, 112.

The planned flight path 102 is bounded by the region of space 106 that is defined by an altitude threshold 126, a lateral threshold 128, and a range threshold 130. The altitude threshold 126 is defined by a distance below the planned flight path 102 and a distance above the planned flight path 102. The lateral threshold 128 is defined by distance to either side of the planned flight path 102. The range threshold 130 is defined by a distance from the aircraft 104 along the planned flight path 102. The distances defining the altitude threshold 126, the lateral threshold 128, and the range threshold 130 may be the same or different. Further, the distances may be predefined or adjustable. For example, the range threshold 130 may be automatically adjustable to correspond to other information displayed to the crew members of the aircraft 104 and/or may be manually adjustable to a range of interest by the crew members of the aircraft 104.

Various distances 132, 134, 136 out from the aircraft 104 are also illustrated. These distances 132, 134, 136 may be displayed to the crew, and indicate the relative distance of the storm cells 108, 110, 112 and the turbulence regions 114, 116, 118, 120, 122, 124 from the aircraft 104.

It is appreciated that most of the storm cell 108 lies within the region of space 106. Accordingly, the turbulence region 114 lies within the region of space 106. However, the top portion of the storm cell 108 lies above the region of space 106. Accordingly, the turbulence region 116 lies outside of the region of space 106. The altitude of the turbulence region 116 is therefore greater than the upper value of the altitude threshold 126.

A lower portion of the storm cell 112 lies within the region of space 106. The turbulence region 120 lies above the region of space 106. Accordingly, the turbulence region 120 lies outside of the region of space 106. The altitude of the turbulence region 120 is therefore greater than the upper value of the altitude threshold 126.

The storm cell 110 lies completely outside of the region of space 106. Accordingly, the turbulence region 118 also lies outside the region of space 106. The lateral distance of the turbulence region 116 from the planned flight path 102 is therefore greater than the right side value of the lateral threshold 128.

The clear air turbulence region 122 lies along the planned flight path 102. The clear air turbulence region 124 lies outside of the region of space 106. Thus, the lateral distance of the clear air turbulence region 124 from the planned flight path 102 is therefore greater than the right side value of the lateral threshold 128.

Embodiments of the turbulence discriminating system 300 (FIG. 3) are configured to identify turbulence regions that lie outside of the region of space 106, and are further configured to format and present icons with a first format on a display to indicate to a viewing crew member of the aircraft 104 that the identified turbulence regions are outside of the region of space 106. Accordingly, the crew member may assess the relative significance of the turbulence region. For example, for turbulence regions 118, 120, and/or 124 that lie outside of the region of space 106, the crew member may conclude that the turbulence regions 120, 124, and/or 118 will not likely have a significant impact on the aircraft based upon the current planned flight path 102. Such turbulence regions 118, 120, and/or 124 may be referred to as secondary turbulence regions or non-relevant turbulence regions herein.

Turbulence regions within the region of space 106 are indicated on the display with icons having a different icon format. For example, for turbulence regions 114 and/or 122 that lie inside of the region of space 106, the crew member may conclude that the turbulence regions 114 and/or 122 may have a significant impact on the aircraft based upon the current planned flight path 102. Such turbulence regions 114 and/or 122 may be referred to as primary turbulence regions or relevant turbulence regions herein.

Alternative embodiments of the turbulence discriminating system 300 (FIG. 3) are configured to identify storm cells that lie outside of the region of space 106, and are further configured to format and present icons on a display to indicate to a viewing crew member of the aircraft 104 that the identified storm cells are outside of the region of space 106. Accordingly, the crew member may assess the relative significance of the storm cell. For example, for the storm cell 110 that lies outside of the region of space 106, the crew member may conclude that the storm cell 110 will not likely have a significant impact on the aircraft based upon the current planned flight path 102. Such storm cells may be referred to as secondary storm cells or non-relevant storm cells.

Storm cells within the region of space 106 are indicated on the display with icons having a different icon format. For example, for the portion of the storm cell 108 that lies inside of the region of space 106, the crew member may conclude that the storm cell 108 may have a significant impact on the aircraft based upon the current planned flight path 102. Such storm cells may be referred to as primary storm cells or relevant storm cells herein.

Figure 2:
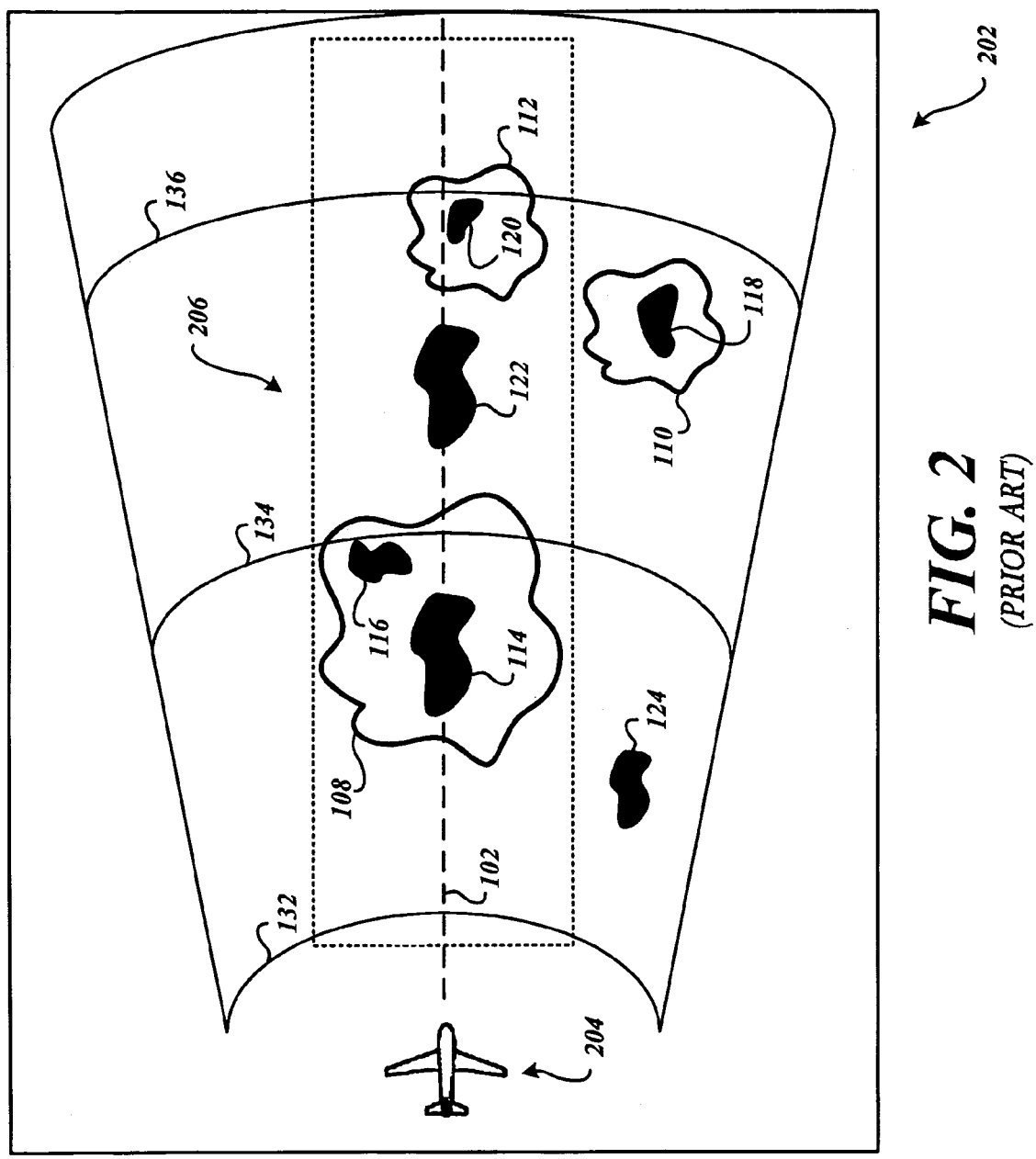
FIG. 2 is a prior art plan view display presenting a view of the planned flight path through the region of space having the plurality of storm cells and turbulence regions.

FIG. 2 is a prior art plan view display 202 presenting a view of the planned flight path 102 through the region of space 106 having the plurality of storm cell icons 108, 110, 112 and turbulence region icons 114, 116, 118, 120, 122, 124. An icon 204 depicts the relative location of the aircraft 104 on the prior art plan view 202. An icon 106 depicts the relative location of the region of space 106 on the prior art plan view 202. An icon can be of fixed shape and/or size. Additionally, an icon can depict an arbitrarily shaped area with a distinctive pattern, color, and/or boundary that corresponds to the actual size of the weather-related phenomenon.

For convenience, the reference numerals of the storm cell icons 108, 110, 112 are the same as the reference numerals used to identify the storm cells 108, 110, 112 of FIG. 1. Similarly, the reference numerals of the turbulence region icons 114, 116, 118, 120, 122, 124 are the same as the reference numerals used to identify the turbulence regions 114, 116, 118, 120, 122, 124 of FIG. 1. For example, the storm cell icon 108 corresponds to the storm cell 108 illustrated in FIG. 1. Similarly, the reference numeral of the icon 106 corresponds to a plan view of the region of space 106.

The storm cell icons 108, 110, 112 correspond to a plan view that indicates the lateral extents of their respective storm cells 108, 110, 112. Furthermore, the lateral extents of the storm cell icons 108, 110, 112 indicate the relative location of the respective storm cells 108, 110, 112 to the aircraft 104 (FIG. 1). Similarly, the turbulence region icons 114, 116, 118, 120, 122, 124 indicate the lateral extents of their respective turbulence regions 114, 116, 118, 120, 122, 124. Furthermore, the lateral extents of the turbulence region icons 114, 116, 118, 120, 122, 124 indicate the relative location of the respective turbulence regions 114, 116, 118, 120, 122, 124 to the aircraft 104.

For clarity, the turbulence region icons 114, 116, 118, 120, 122, 124 are illustrated with a black fill. The storm cell icons 108, 110, 112 are illustrated with a white fill. In practice, colors may be used for icon fills to further assist the crew members in discerning the storm cells and/or the turbulence regions. Further, different fill colors may be used to indicate different characteristics of the storm cells and/or the turbulence regions. For example, a green fill color may be used to identify relatively less severe portions of a storm cell, a yellow fill color may be used to identify relatively moderately severe portions of the storm cell, and a red fill color may be used to identify relatively more severe portions of the storm cell. A magenta fill color may be used to identify turbulence regions.

Crew members, upon viewing the prior art plan view 202 are not able to discern altitude information pertaining to the storm cell icons 108, 110, 112 and/or the turbulence region icons 114, 116, 118, 120, 122, 124 (in the absence of supplemental alpha numeric information). More particularly, the crew members will not be able to determine if any of the storm cells 108, 110, 112, or if any of the turbulence regions 114, 116, 118, 120, 122, 124, lie above and/or below the region of space 106, as defined by the altitude threshold 126 (FIG. 1).

Figure 3:
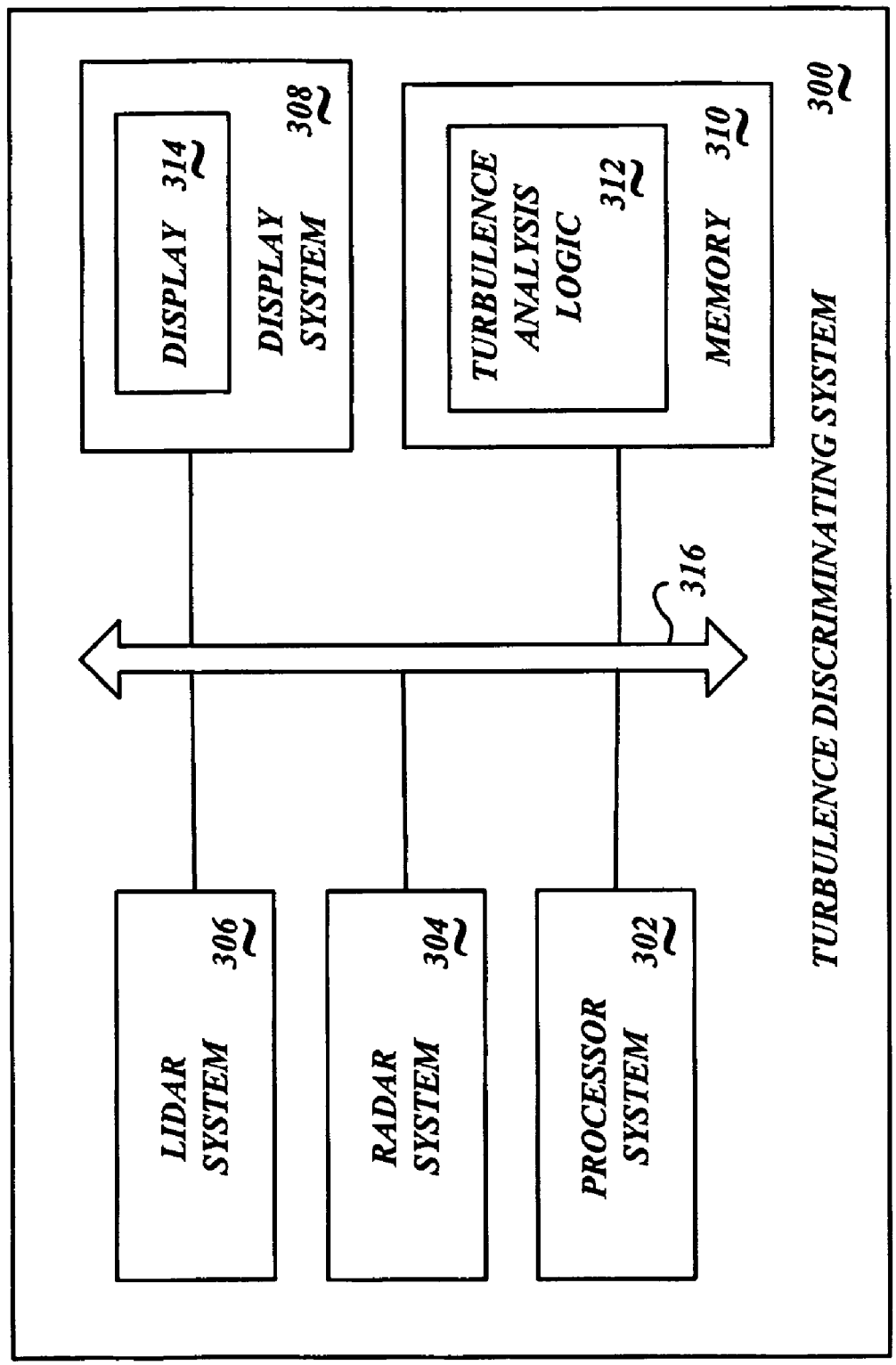
FIG. 3 is a block diagram of an embodiment of the turbulence discriminating system.

FIG. 3 is a block diagram of an embodiment of the turbulence discriminating system 300. The turbulence discriminating system 300 comprises a processor system 302, a radar system 304, an optional light detection and ranging (LIDAR) system 306, a display system 308, and a memory 310. Embodiments may have additional components (not shown) that perform additional functions. Further, in alternative embodiments, various components of the turbulence discriminating system 300 may reside in other locations and/or may be part of other systems. For example, the radar system 304 may be a separate stand-alone system that provides input to the turbulence discriminating system 300. As another non-limiting example, the memory 310 may be a remote memory device that is configured to also store information and transmit information to other devices or systems. Alternatively, or additionally, the memory 310 may be a component of another system to which the turbulence discriminating system 300 is communicatively coupled to.

The weather analysis logic 312 resides in a portion of the memory 310 The processor system 302 retrieves and executes the weather analysis logic 312 to identify secondary or non-relevant turbulence regions. Alternative embodiments may identify secondary or non-relevant storm cells.

The processor system 302, the radar system 304, the optional LIDAR system 306, the display system 308, and the memory 310, are coupled to a communication bus 316, thereby providing connectivity to the above-described components. In alternative embodiments of the turbulence discriminating system 300, the above-described components may be communicatively coupled to to each other in a different manner. For example, one or more of the above-described components may be directly coupled to the processor system 302, or may be coupled to the processor system 302 via intermediary components (not shown).

The radar system 304 and the optional LIDAR system 306 are configured to emit electromagnetic energy in a known direction, typically in the direction of the planned flight path 102 that the aircraft 104 is travelling. When the emitted electromagnetic energy is reflected from weather phenomena, the radar system 304 and/or the optional LIDAR system 306 are configured to analyze the returning reflected electromagnetic energy. Analysis of the returning reflected electromagnetic energy allows identification of the type of weather phenomena, such as storm cells or regions of turbulences, and the relative location of the weather phenomena to the aircraft 104 (range, angle, and azimuth). The optional LIDAR system 306 can identify clear air turbulence regions.

Embodiments of the turbulence discriminating system 300 are configured to compare the relative location of identified turbulence regions with the altitude threshold 126. If an identified turbulence region is within the altitude threshold 126, the identified turbulence region is defined as a primary turbulence region. That is, if the identified turbulence region is lower than the upper altitude defined by the altitude threshold 126, or if the identified turbulence region is above the lower altitude defined by the altitude threshold 126, then the identified turbulence region is defined as a primary turbulence region.

However, if an identified turbulence region is outside of the altitude threshold 126, the identified turbulence region is defined as a secondary turbulence region. That is, if the identified turbulence region is above the upper altitude defined by the altitude threshold 126, or if the identified turbulence region is lower than the lower altitude defined by the altitude threshold 126, then the identified turbulence region is defined as a secondary turbulence region.

Some embodiments of the turbulence discriminating system 300 may also assess the lateral position of an identified turbulence region. If the identified turbulence region is outside of the region of space 106, as defined by the lateral threshold 128, the identified turbulence region may be defined as a secondary turbulence region. If the identified turbulence region is within of the region of space 106, as defined by the lateral threshold 128, the identified turbulence region may be defined as a primary turbulence region.

Some embodiments of the turbulence discriminating system 300 may also assess the lateral position of an identified storm cell. If the identified storm cell is outside of the region of space 106, as defined by the altitude threshold 126 and/or the lateral threshold 128, the identified storm cell may be defined as a secondary storm cell. If the identified storm cell is within of the region of space 106, the identified storm cell may be defined as a primary storm cell.

Once the identified turbulence region and/or storm cell is defined as a primary turbulence region or primary storm cell, or is defined as a secondary turbulence region or secondary storm cell, the processor system 302 generates icons corresponding to the identified primary turbulence regions, the identified primary storm cells, the identified secondary turbulence regions, and/or the identified secondary storm cells are presented on the display system 308. The generated icon is communicated to the display screen 314 for presentation.

Display system 308 presents (displays) the icon on its display screen 314. Location of the presented icon on the display screen 314 indicates the location of the identified turbulence region and/or storm cell relative to the aircraft 104. The size and/or shape of the presented icon indicates the relative size of the identified turbulence region and/or storm cell. The icon format (fill color, pattern, and/or intensity/brightness) may be used to indicate the severity of the identified turbulence region and/or storm cell. Further, the icon format may be used to differentiate between an identified turbulence region and an identified storm cell.

Embodiments of the turbulence discriminating system 300 use different icon formats (fill patterns, color, and/or intensity/brightness) of the presented icons to differentiate between primary turbulence regions and secondary turbulence regions. Accordingly, the crew member of the aircraft 104 viewing the presented icon format can easily and quickly differentiate the primary turbulence regions from the secondary turbulence regions. If additional information regarding the identified turbulence region is required, supplemental alpha numeric information may be presented.

Additionally, or alternatively, embodiments of the turbulence discriminating system 300 use different icon formats (fill patterns, color, and/or intensity/brightness) of the presented icons to differentiate between primary storm cells and secondary storm cells. Accordingly, the crew member of the aircraft 104 viewing the presented icon can easily and quickly differentiate the primary storm cells from the secondary storm cells. If additional information regarding the identified storm cell is required, supplemental alpha numeric information may be presented.

Figure 4:
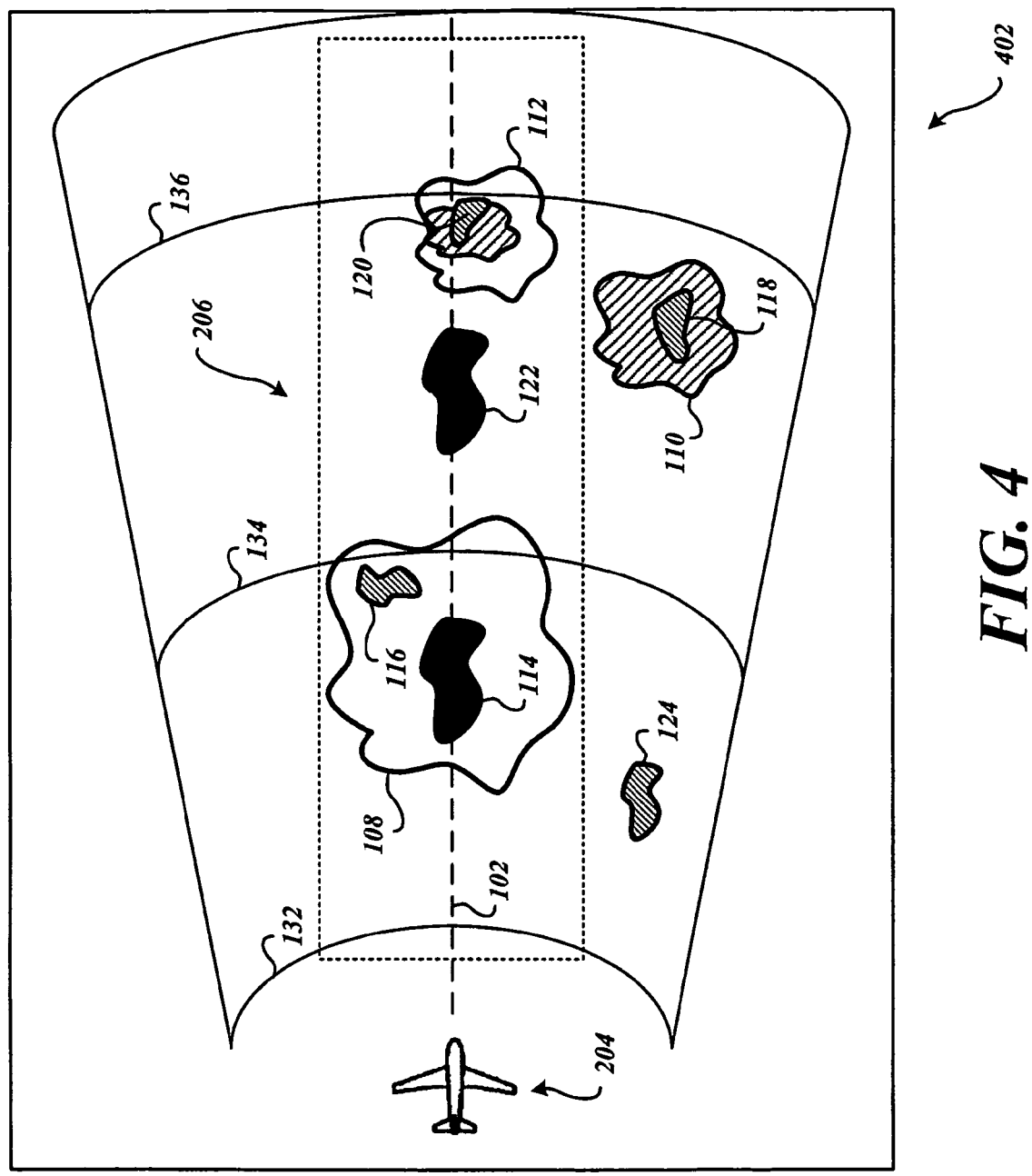
FIG. 4 is a plan view display presenting a view of the planned flight path through the region of space having the plurality of storm cells and turbulence regions prepared by embodiments of the turbulence discriminating system.

FIG. 4 is a plan view display 402 presenting a view of the planned flight path 102 on the display screen 314. The plan view 402 presents a view of the planned flight path 102 through the region of space 106 with icons corresponding to the plurality of storm cells 108, 110, 112 and turbulence regions 114, 116, 118, 120, 122, 124 prepared by embodiments of the turbulence discriminating system 300. Similar to FIG. 2, reference numerals of the icons of FIG. 4 correspond to the reference numerals of the storm cells and the turbulence regions of FIG. 1 for convenience.

In this exemplary embodiment, diagonal hash marks are used to present identified secondary turbulence regions 116, 120, 124, and 118. The identified secondary turbulence region 120, in this exemplary presentation on the display screen 314, is understood by the viewing crew member to be above or below the region of space 106 about the planned flight path 102. Embodiments may use different selected icon formats (fill pattern schemes, fill color schemes, and/or intensity schemes) to differentiate the secondary turbulence regions from the primary turbulence regions. Further, embodiments may use different selected icon formats (fill pattern schemes, fill color schemes, and/or intensity schemes) to differentiate the secondary turbulence regions that are above the region of space 106 from the secondary turbulence regions that are below the region of space 106.

Further, in this exemplary embodiment, the diagonal hash marks (with different directions) are used to present identified secondary storm cells. The identified secondary storm cell 110, in this exemplary presentation on the display screen 314, is understood by the viewing crewmember to be to the right side of the region of space 106 about the planned flight path 102. Further, portions of some storm cells may lie within the region of space 106, and other portions of the same storm cell may lie outside of the region of space 106. Such portions may be identified. Embodiments may use different selected icon formats (fill pattern schemes, fill color schemes, and/or intensity schemes) to differentiate the secondary storm cells from the primary storm cells.

Alternative embodiments may receive information pertaining to storm cells and turbulence regions from a remote source, such as a ground station or another aircraft. The received information may be analyzed as described herein to identify storm cells as primary storm cells or secondary storm cells, and/or to identify turbulence regions as primary turbulence regions or secondary turbulence regions.

In an alternative embodiment, the secondary storm cells and/or the secondary turbulence regions with altitudes above the altitude threshold 126 are presented using an icon format that is different from the icon format used to present the secondary storm cells and/or the secondary turbulence regions with altitudes below the altitude threshold 26.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for discrimination of weather based on location, the method comprising:
automatically comparing a location of the weather with a location of a region of space corresponding to a planned flight path of an aircraft;
in response to the location of the weather being outside of the region of space, automatically presenting an icon corresponding to the weather using a first icon format; and
in response to the location of the weather being within the region of space, automatically presenting the icon corresponding to the weather using a second icon format, the second icon format different from the first icon format.

2. The method of claim 1, wherein automatically comparing the location of the weather with the location of the region of space further comprises:
automatically comparing the location of the weather with an altitude threshold defining the region of space corresponding to the planned flight path, and
wherein automatically presenting the icon corresponding to the weather further comprises:
in response to an altitude of the weather being above the altitude threshold, automatically presenting the icon corresponding to the weather using the first icon format;
in response to the altitude of the weather being below the altitude threshold, automatically presenting the icon corresponding to the weather using the first icon format; and
in response to the altitude of the weather being within the altitude threshold, automatically presenting the icon corresponding to the weather using the second icon format.

3. The method of claim 1, wherein automatically comparing the location of the weather with the location of the region of space further comprises:
automatically comparing the location of the weather with an altitude threshold defining the region of space corresponding to the planned flight path, and
wherein automatically presenting the icon corresponding to the turbulence region further comprises:
in response to an altitude of the weather being above the altitude threshold, automatically presenting the icon corresponding to the weather using the first icon format;
in response to the altitude of the weather being below the altitude threshold, automatically presenting the icon corresponding to the weather using a third icon format; and
in response to altitude of the weather being within the altitude threshold, automatically presenting the icon corresponding to the weather using the second icon format.

4. The method of claim 1, wherein automatically comparing the location of the weather with the location of the region of space further comprises:
automatically comparing the location of the weather with a lateral threshold defining the region of space corresponding to the planned flight path, and
wherein automatically presenting the icon corresponding to the weather further comprises:
in response to the location of the weather being to the outside of the lateral threshold, automatically presenting the icon corresponding to the weather using the first icon format; and
in response to location of the weather being within the lateral threshold, automatically presenting the icon corresponding to the weather using the second icon format.

5. The method of claim 1 wherein the weather is a region of turbulence.

6. The method of claim 5 wherein the weather is a storm cell.

7. The method of claim 1, further comprising:
determining the location of the weather from radar information.

8. The method of claim 1, further comprising:
determining the location of the weather from an optional light detection and ranging (LIDAR) information.

9. The method of claim 1, wherein the presenting comprises:
determining the location of the weather from information received from a remote source.

10. The method of claim 1, wherein the presenting comprises:
presenting the icon on a plan view display.

11. A system for discrimination of weather based on location, comprising:
a radar system configured to detect the weather and configured to generate information pertaining to the detected weather;
a processor system communicatively coupled to the radar system and configured to:
determine a location of the weather from the information received from the radar system;
compare the location of the weather with a location of a region of space corresponding to a planned flight path of an aircraft;
in response to the determined location of the weather being outside of the region of space, generate an icon corresponding to the weather using a first icon format; and
in response to determined location of the weather being within the region of space, generate the icon corresponding to the weather using a second icon format, the second icon format different from the first icon format; and
a display system communicatively coupled to the processor system, configured to receive the generated icon from the processor system, and configured to present the received icon on a display screen.

12. The system of claim 11 wherein the weather is a region of turbulence.

13. The system of claim 11 wherein the weather is a storm cell.

14. The system of claim 11, wherein the processor system is configured to:
determine an altitude of the weather from the information received from the radar system;
compare the altitude of the weather with an altitude threshold defining the region of space corresponding to the planned flight path;
in response to an altitude of the weather being above the altitude threshold, generate the icon corresponding to the weather using the first icon format;
in response to the altitude of the weather being below the altitude threshold, generate the icon corresponding to the weather using the first icon format; and
in response to determined location of the weather being within the altitude threshold, generate the icon corresponding to the weather using the second icon format.

15. The system of claim 11, wherein the processor system is configured to:
determine an altitude of the weather from the information received from the radar system;
compare the altitude of the weather with an altitude threshold defining the region of space corresponding to the planned flight path;
in response to an altitude of the weather being above the altitude threshold, generate the icon corresponding to the weather using the first icon format;
in response to the altitude of the weather being below the altitude threshold, generate the icon corresponding to the weather using a third icon format; and
in response to determined location of the weather being within the altitude threshold, generate the icon corresponding to the weather using the second icon format.

16. The system of claim 11, wherein the processor system is configured to:
compare the determined location of the weather with a lateral threshold for the region of space corresponding to the planned flight path;
in response to the location of the weather being to the outside of the lateral threshold, generate the icon corresponding to the weather using the first icon format; and
in response to determined location of the weather being within the lateral threshold, generate the icon corresponding to the weather using the second icon format.

17. The system of claim 12, wherein the radar system, the processor system, and the display system are components of an aircraft weather display system.

18. A system for discrimination of turbulence based on location, comprising:
a means for detecting weather;
a means for receiving information from the means for detecting weather, the received information corresponding to the detected weather;
a means for determining a location of the weather from the information received from the means for detecting weather;
a means for comparing the location of the weather with a location of a region of space corresponding to a planned flight path of an aircraft;
a means for generating an icon, wherein in response to the determined location of the weather being outside of the region of space, the icon is generated with a first icon format, and in response to determined location of the turbulence region being within the region of space, the icon is generated with a second icon format, the second icon format different from the first icon format; and
a means for displaying the generated icon.

19. The system of claim 18 wherein the weather is a region of turbulence.

20. The system of claim 18 wherein the weather is a storm cell.

* * * * *